United States Patent
Grigg et al.

[11] Patent Number: 6,158,624
[45] Date of Patent: Dec. 12, 2000

[54] FOAM DISPENSING GUN

[75] Inventors: Emmanuil Grigg, Chesterfield; Leon Gurevich, Grover; Floyd French, Ballwin; Michael Boakye-Danquah, Hazelwood; James P. McBroom, House Springs, all of Mo.

[73] Assignee: The Clayton Corporation, Fenton, Mo.

[21] Appl. No.: 08/907,380

[22] Filed: Aug. 7, 1997

[51] Int. Cl.[7] ........................................................ B67D 5/60
[52] U.S. Cl. ................................ 222/145.6; 222/153.14
[58] Field of Search ............................... 222/145.1, 145.4, 222/145.5, 145.6, 153.14; 251/89; 239/304, 306, 526, 527, 414

[56] References Cited

U.S. PATENT DOCUMENTS

| | | |
|---|---|---|
| 4,730,775 | 3/1988 | Maas . |
| 4,767,060 | 8/1988 | Shay et al. . |
| 4,768,717 | 9/1988 | Shay . |
| 4,779,803 | 10/1988 | Corsette . |
| 4,883,227 | 11/1989 | Maas . |
| 4,911,361 | 3/1990 | Tada . |
| 4,913,317 | 4/1990 | Wernicke . |
| 5,158,233 | 10/1992 | Foster et al. . |
| 5,219,097 | 6/1993 | Huber et al. . |
| 5,246,143 | 9/1993 | Cherfane . |
| 5,265,761 | 11/1993 | Brown . |
| 5,271,537 | 12/1993 | Johnson . |
| 5,441,180 | 11/1993 | Woodruff . |
| 5,445,228 | 8/1995 | Rathmell et al. . |
| 5,462,204 | 10/1995 | Finn . |

*Primary Examiner*—Joseph A. Kaufman
*Attorney, Agent, or Firm*—Paul M. Denk

[57] ABSTRACT

A foam dispensing gun is provided which dispenses a urethane foam. The foam gun, in one aspect, has a dual valve member in which valve seats are moved relative to valve members to open and close flow paths through the foam gun. The valve member opens the flow paths substantially simultaneously and to substantially the same degree so that the A and B resins will be mixed in a 1:1 ratio. The gun is provided with a locking or stop mechanism to prevent accidental activation of the foam gun. In a second aspect of the invention, a disposable urethane foam gun is provided which has only one moving part and no O-rings.

17 Claims, 8 Drawing Sheets

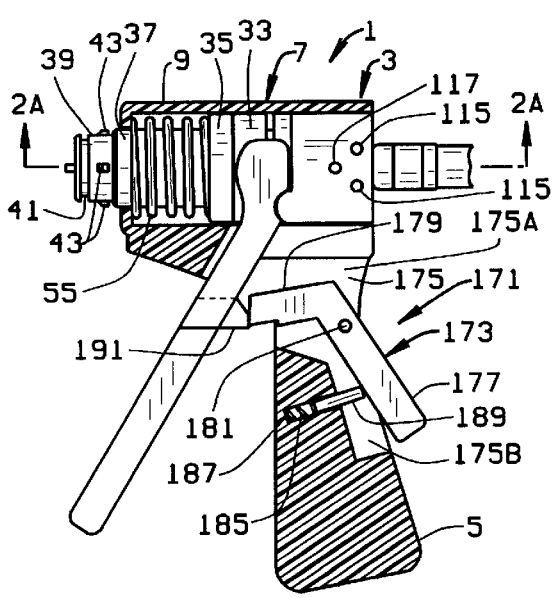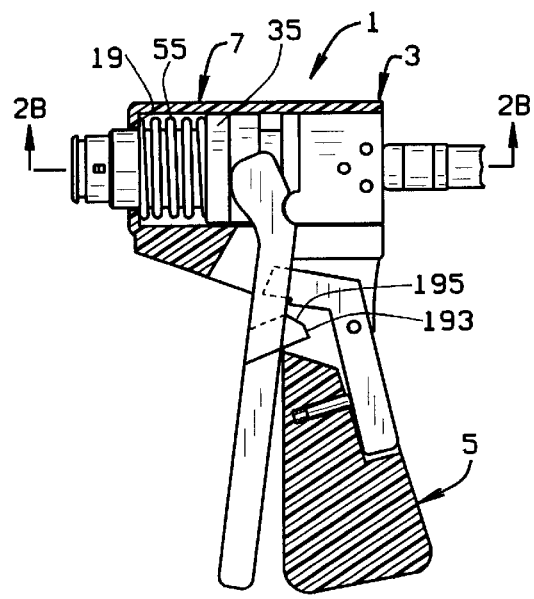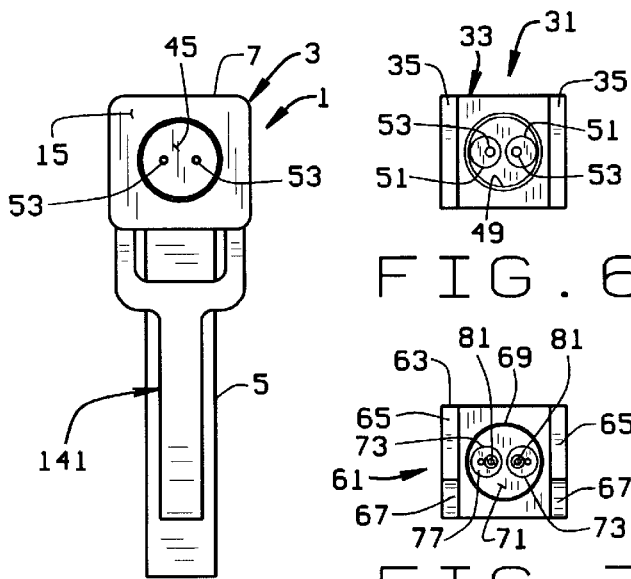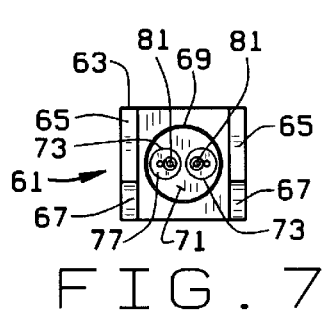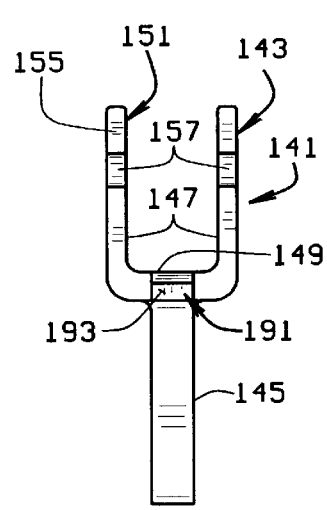

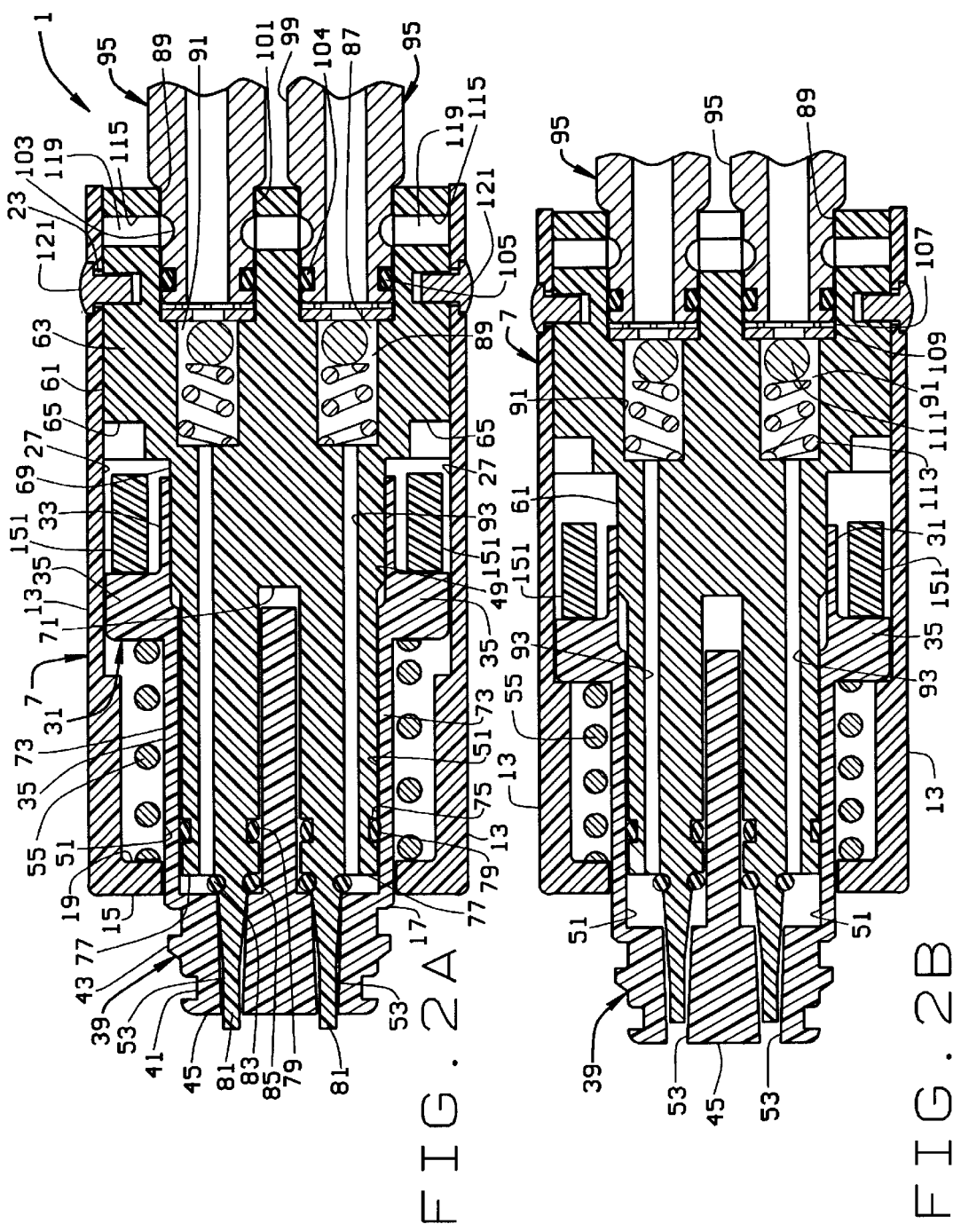

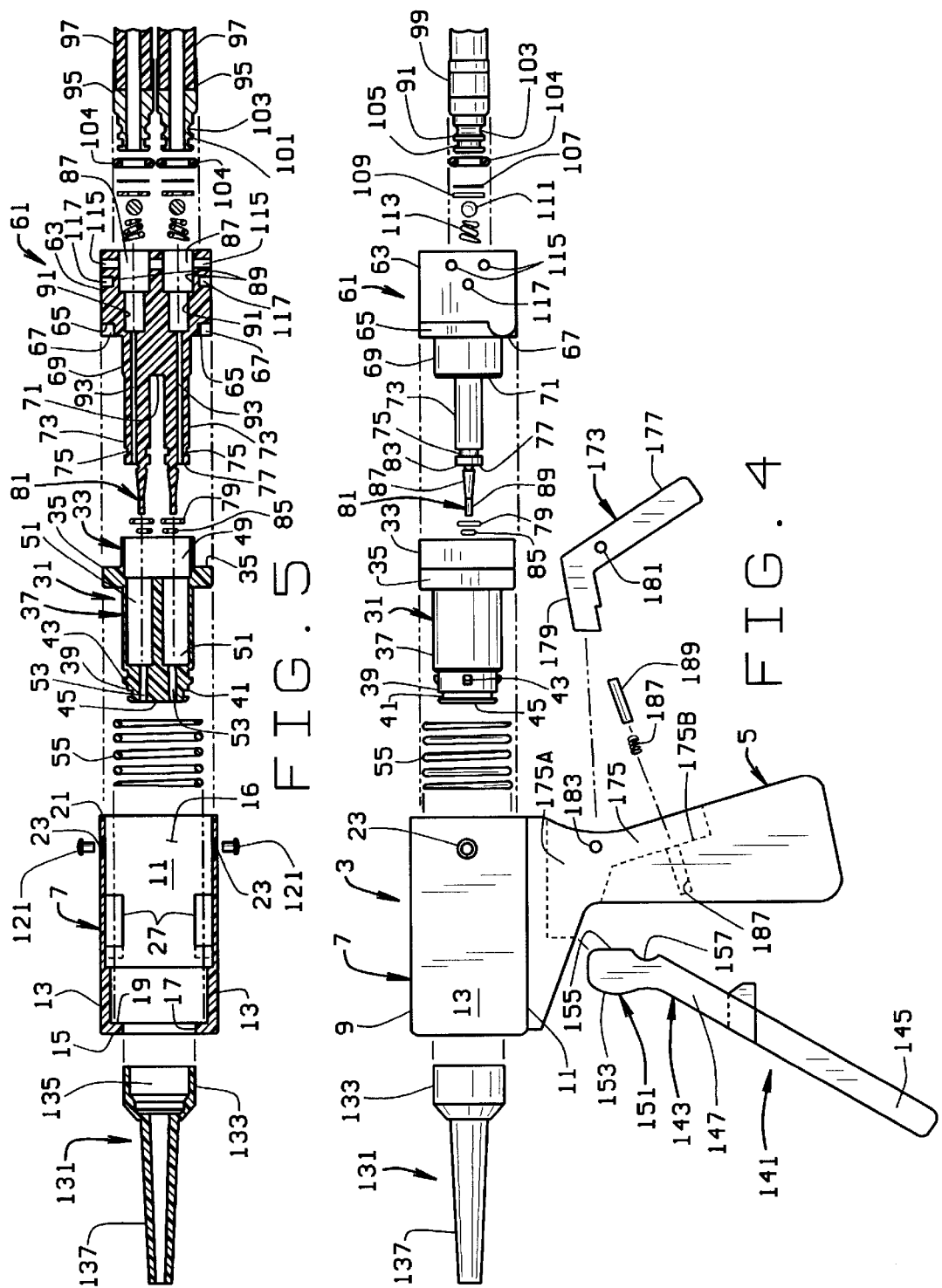

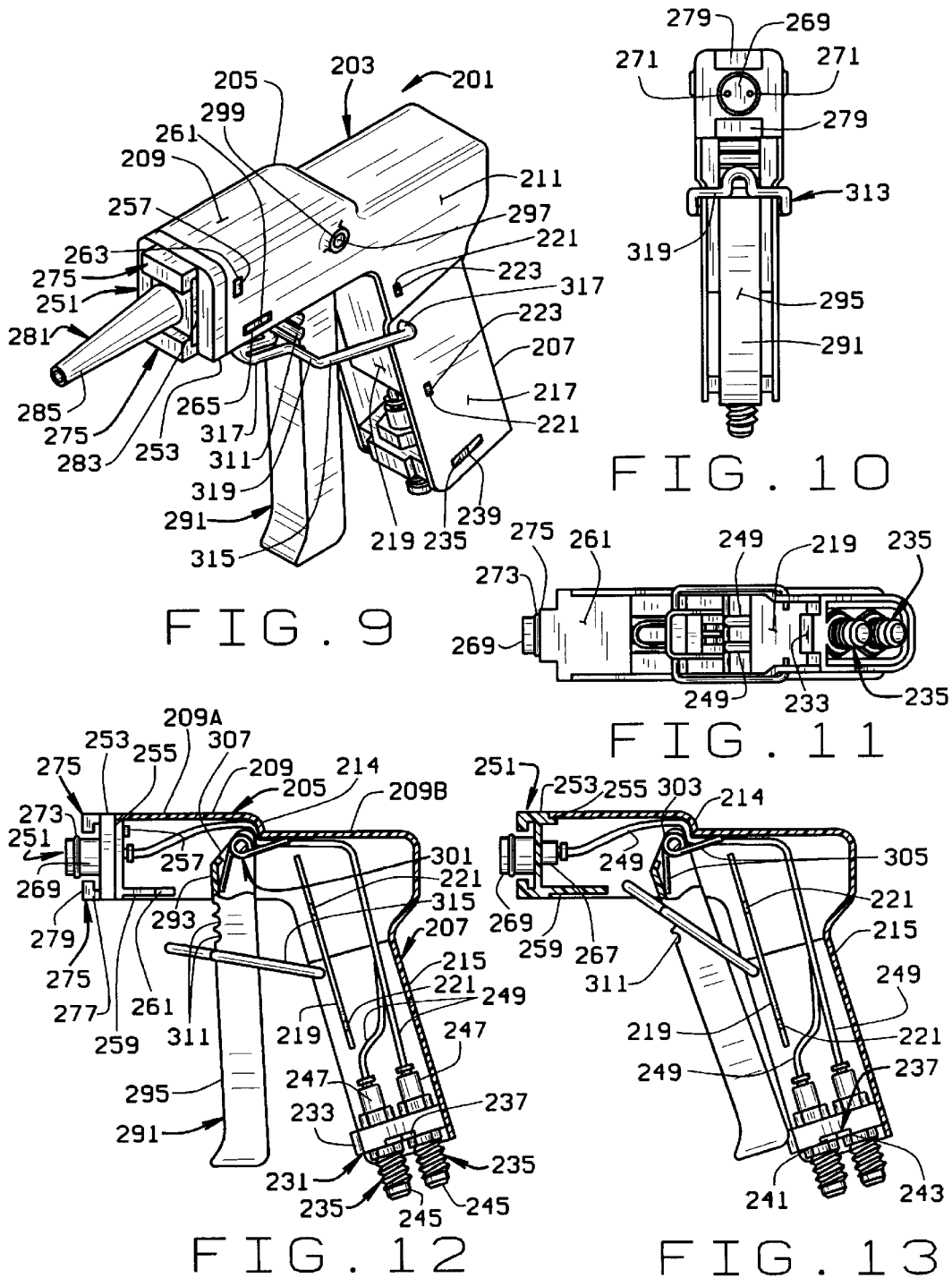

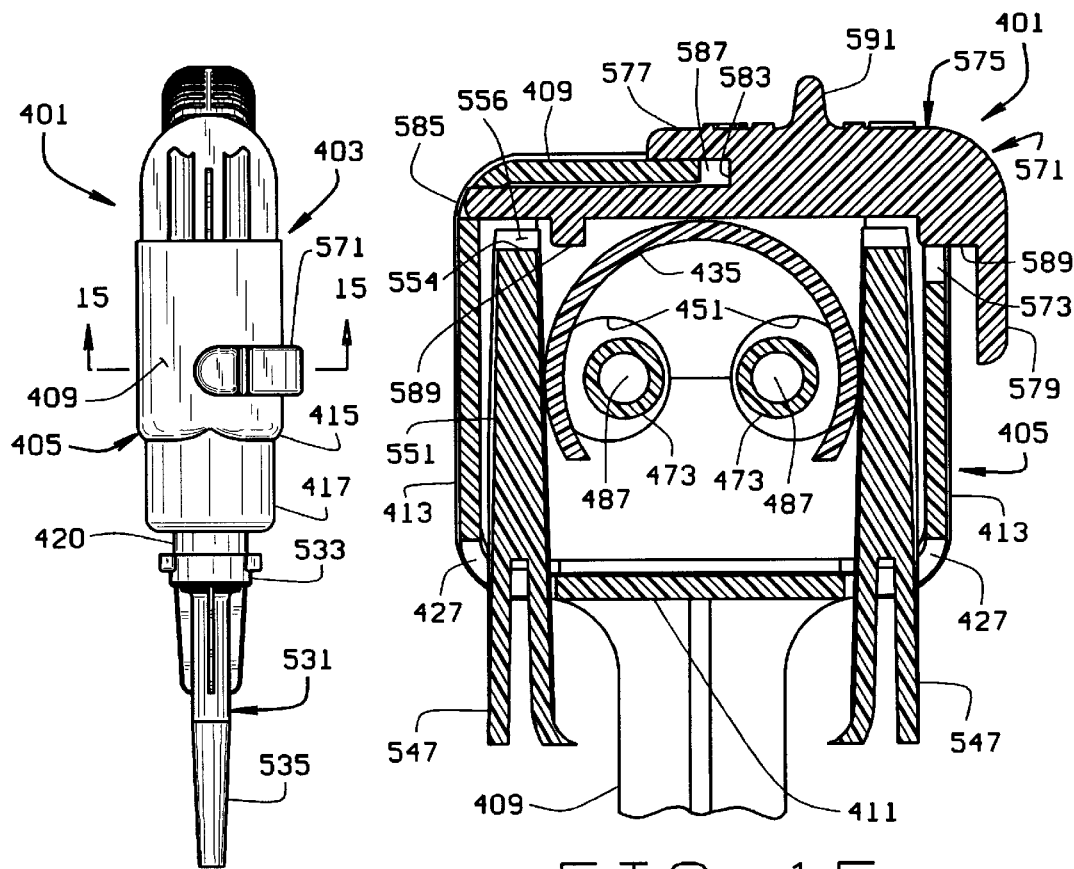
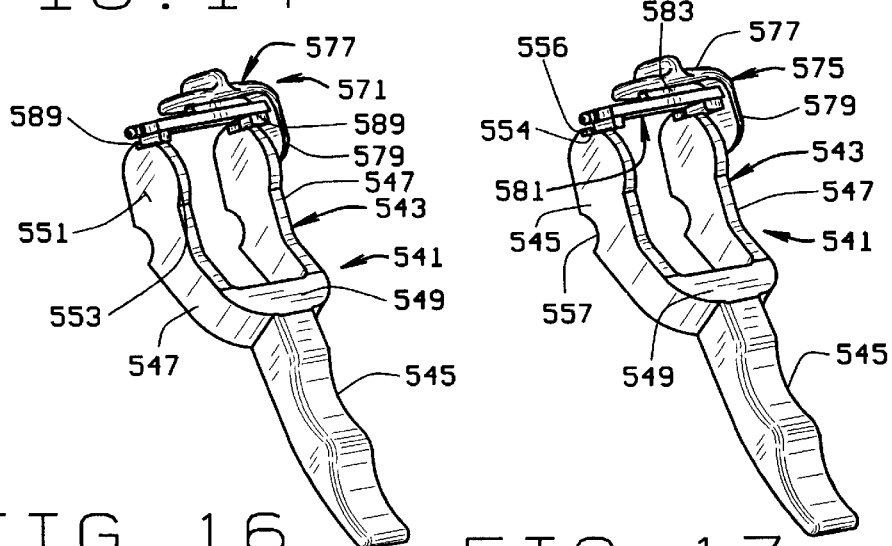
FIG. 14  FIG. 15  FIG. 16  FIG. 17

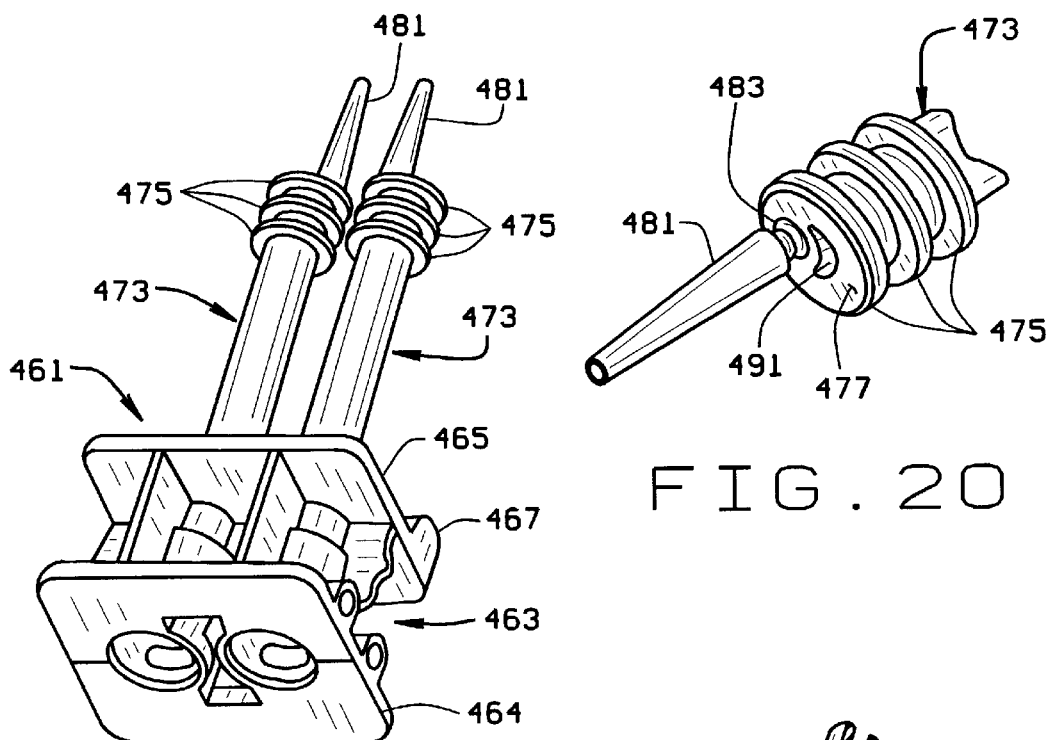
FIG. 19
FIG. 20
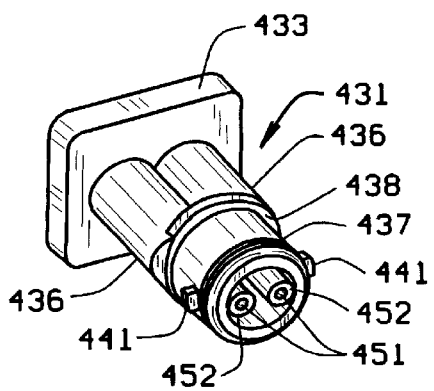
FIG. 21
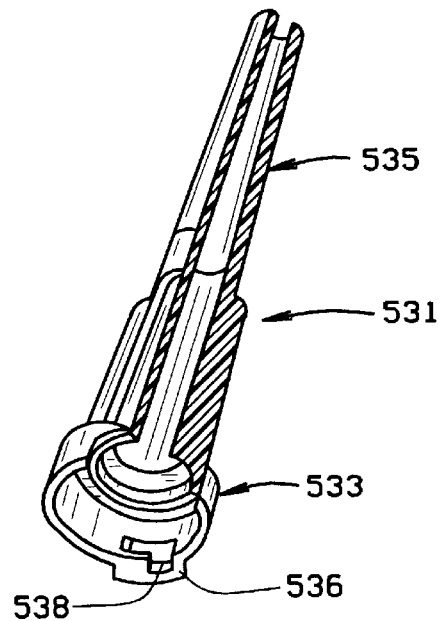
FIG. 22

FOAM DISPENSING GUN

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

The present invention is related to a foam dispensing gun which dispenses a settable urethane foam made from two components which react with each other to form the foam, and, in particular, to such a gun which will dispense the two components in substantially a 1:1 ratio ±5%, in which the two components are not mixed until they reach the exit nozzle, and in which the flow of the resins through the gun can be more easily controlled.

The foam dispensing technology is based on dispensing two liquid resin components, A and B, with a manually operated apparatus which keeps the two components separate until they reach a mixing area. As is known, once the two components are combined in the mixing area, the components react with each other to produce a quickly curing urethane foam. Prior devices include numerous configurations for activation of the trigger, various valve concepts and different discharge characteristics. Examples of the prior devices are shown in U.S. Pat. No. 4,913,317 to Wemicke, U.S. Pat. No. 5,158,233 to Foster et al., U.S. Pat. No. 5,219,097 to Huber et al., U.S. Pat. No. 5,246,143 to Cherfane, U.S. Pat. No. 5,265,761 to Brown, U.S. Pat. No. 5,271,537 to Johnson, and U.S. Pat. No. 5,462,204 to Finn. There are numerous variations of the types of foam dispensing guns described in these patents, however all such variations have drawbacks to a greater or lesser degree that have not been fully resolved.

Some of the problems can best be seen in the foam gun disclosed by Finn, U.S. Pat. No. 5,462,204. Some of the disadvantages of the Finn design are due to the two movable needles employed by the design. The two needles need separate springs and seals. Further, there are two sets of seals for each needle to prevent the components from entering the chamber which receives the arms of the trigger which move the needles. If resins enter this area, or if contaminates get into this area, the foam gun can be rendered useless. The formation of two separate high pressure chambers, one at the front and another at the back of the movable needles, increases the chances for seal failure due to contamination. Another disadvantage is due to a passage geometry which restricts or impedes the flow of materials through the gun. The flow path followed by the material changes direction twice which reduces material velocity through the gun. Yet another problem of this type of passage geometry is that resin or foam, which is not fully dissolved, will accumulate in the passageway. This collection of contaminants in the passageway can cause premature closure of the passageway. This can obviously adversely affect the function of the gun.

Another problem is created by the ability of foreign matter to enter the passageways through the trigger receiving chamber in the middle section of the needles. This chamber is designed to be open to the outside to engage a trigger. Thus the seals are exposed, and contaminates can easily collect in the chamber. Contaminates may also be brought into the rear high pressure chamber by movement of the needle. This area may have a residual coating of the resin. The accumulation of materials is also possible due to the fact that each of materials "A" and "B" will harden over time when they are exposed to an open atmospheric conditions. The presence of moisture will accelerate material hardening.

BRIEF SUMMARY OF THE INVENTION

On object of this invention is to provide a new and improved foam dispensing gun.

Another object is to provide such a gun which has as few moving parts and chambers as possible.

Another object is to provide such a gun which is inexpensive to produce and is reliable in operation.

Another object is to provide such a gun which utilizes a control mechanism which does not rely on movement of pins to control the flow of the components through the gun.

Yet another object is to provide such a gun in which the flow path followed by the components to the mixing chamber does not have sharp turns which would reduce the velocity and hence cavitation of the resin components.

Yet another object is to provide such a gun in which the flow control mechanism will open and close both passageways substantially simultaneously.

Yet another object is to provide such a gun in which the number of sealed areas and number of O-rings required is minimized.

Yet another object is to provide such a gun which may be secured against accidental activation.

In accordance with the invention, generally stated, a foam dispensing gun is provided from which a urethane foam is ejected, the foam being produced by the reaction of an A component and a B component. The foam gun includes a one-piece gun body having a housing and a grip depending from the housing, the grip being sized to be gripped by a user. A dual valve assembly is contained positioned in the housing. The valve assembly has two separate and independent fluid flow paths, each of which has an entrance and an exit. A valve element and a valve seat are provided in each flow path and are movable between a first, closed position, and a second, opened position. The valve assembly is made of a needle assembly and a cup assembly.

The needle assembly has a body, two fingers extending from the needle assembly body, an A fluid flow path extending through the needle assembly body and one of the two fingers, and a B fluid flow path extending through the needle assembly body and a second of the two fingers. A needle or pin extends forwardly from the end of each finger, offset from the exits of the needle assembly flow paths from the fingers.

The cup assembly is slidably received in the gun body housing. The cup assembly has two separate passages extending through it. The passages each have a first portion which slidably receives the fingers of the needle assembly and a second portion which slidably receives the needles of the needle assembly. With respect to the valve assembly, the needle of the needle assembly is the valve member and the entrance to the cup assembly passage second portion is the valve seat. The flow paths of the valve assembly are defined by the flow paths through the needle assembly, a portion of the first portion of the cup assembly passage, and the second portion of the cup assembly passage. The inlet to the valve flow paths is defined by the inlet to the needle assembly flow paths and the outlet to the valve flow paths is defined by the outlet from the cup assembly passage second portion.

A nozzle assembly is removably mounted to a front of the housing and receives a front of the cup assembly, such that the flow paths empty into the nozzle. The nozzle includes a mixing chamber in which the A and B components mix and a nozzle through which the mixed components are ejected from the gun.

A trigger assembly is provided to operate the gun. The trigger assembly has an operating arm and is pivotally mounted to the body forwardly of the grip so that it can be pulled toward the grip. The trigger assembly engages the cup so that the cup can be selectively moved relative to the needle assembly between a first position in which the needles engage an opening to the passage second portions such that the valve assembly is closed to prevent flow of the components through the fluid paths and a second position in which the openings to the passage second portions are off-set from the needles such that the valve assembly is opened to permit the passage of the compounds though the foam gun. The cup is preferably biased to the first, closed, position.

The foam gun is provided with a locking mechanism on the grip for maintaining the foam gun cup in the first closed position to prevent accidental activation of the gun. The locking mechanism includes a generally L-shaped lock member which is pivotally mounted to the grip oppositely of the trigger assembly. The lock member includes an operating arm extending along a portion of the handle and a finger extending forwardly of the lock member operating arm. The lock member finger extends through the handle. The lock member is selectively pivoted between a first position in which lock member finger engages the trigger so that the trigger cannot be closed and a second position in which lock member finger does not prevent the trigger from being closed.

The lock member is biased to the first locking position. To bias the lock member to the first position, the foam gun includes a bore in the grip extending forwardly from a rear edge of the handle. A spring and a pin are in the bore, such that the spring will urge the pin against the locking member arm, to pivot the locking member arm outwardly. The trigger includes a post extending rearwardly from the trigger. The lock member finger engaging the trigger post when the lock member is in the first locking position.

In a second embodiment of the locking mechanism, the lock is located on the housing of the foam gun, rather than on the grip of the foam gun. The yoke arms, which extend upwardly through the housing on opposite sides of the cup each have a shoulder formed in its top surface. The lock includes a locking element having a pair of blocks depending from a lower surface of the locking element. The locking element is mounted in the housing to be movable between a first position in which the blocks engage the yoke arm shoulder to prevent pivotal motion of said trigger and a second position in which the blocks are out of engagement with the yoke arm shoulders to allow pivotal motion of said trigger. Preferably, the locking element is mounted in said housing to be slidable transversely relative to said housing. The lock is also provided with a thumb tab on an exterior surface of the locking element to facilitate movement of the locking element between said first and second positions.

In a second aspect of the invention, a disposable foam gun is provided for dispensing a urethane foam. The disposable foam gun includes a body having a housing and a grip depending from the housing, the housing having a forward end. A pair of tubes extend through the body to define an A component flow path and a B component flow path, the flow paths each having an inlet and an outlet, the outlet being at a forward end of the housing. A nozzle mounting assembly is mounted at the forward end of the housing and the flow path outlets are in the nozzle mounting assembly. Connectors at the flow path inlets to enable the A component and B component flow paths to be connected to a source of A component and a source of B component, respectively. A disposable nozzle assembly is removably connectable to the nozzle mounting assembly. The nozzle assembly has a mixing chamber into which the flow paths empty and a nozzle extending forwardly of the mixing chamber. A trigger is pivotally mounted to the gun body and selectively movable between a first position in which the flow paths are closed to prevent the flow of the components through the paths and a second position in which the flow paths are opened to permit the components to flow through the flow paths, the trigger being operable such that the A and B component flow paths are opened and closed substantially simultaneously and are opened to substantially the same degree.

The trigger includes a head received within the housing and an operating arm depending from the head to be grasped by a user. The head engages the tubes such that when the trigger is in the first position, the head compresses the tubes to close the flow paths, and when the trigger is in the second position, the head is moved away from the tubes to allow the A and B components to flow through their respective tubes. The gun housing has a step forming a shoulder in the top surface of the housing. The tubes pass between the shoulder and the trigger head, the tubes being compressed between the shoulder and the trigger head when the trigger is in the first position.

The trigger includes a plurality of notches. A bracket member is provided to engage a selected one of the notches to maintain the gun opened to a desired amount. The bracket has legs extending from opposite sides of the grip forwardly of the trigger and a cross-member extending between the legs in front of the trigger. The cross-member is sized to be received in the trigger grooves and the legs are pivotally received in the handle. Thus, the cross-member can be selectively placed in a desired one of the grooves to maintain the tubes open a desired amount.

BRIEF DESCRIPTION OF THE SEVERAL VIEWS OF THE DRAWINGS

FIG. 1A is a vertical cross-sectional view of a second illustrative embodiment of a foam gun of the present invention, with the gun in an off, or closed, position;

FIG. 1B is a view similar to FIG. 1A, but showing the foam gun in an open and operating position;

FIG. 2A is a cross-sectional view taken along line 2A—2A of FIG. 1A.;

FIG. 2B is a cross-sectional view taken along line 2B—2B of FIG. 1B.;

FIG. 3 is a front elevational view of the foam gun of FIG. 1A;

FIG. 4 is an exploded side elevational view of the foam gun of FIG. 1A;

FIG. 5 is an exploded horizontal cross-sectional view of the foam gun of FIG. 1A;

FIG. 6 is a rear elevational view of a cup of the foam gun;

FIG. 7 is a front elevational view of a needle assembly of the foam gun;

FIG. 8 is a rear elevational view of an operating lever of the foam gun;

FIG. 9 is a perspective view of a third embodiment (prior art) of the foam gun which is disposable;

FIG. 10 is a front elevational view of the prior art disposable foam gun of FIG. 9;

FIG. 11 is a bottom plan view of the prior art disposable foam gun;

FIG. 12 is a cross-sectional view of the prior art disposable foam gun, the foam gun being in a closed or locked position;

FIG. 13 is a view similar to FIG. 12, but with the prior art foam gun being in an open or operating position;

FIG. 14 is a top plan view of the foam gun of FIG. 1;

FIG. 15 is a cross-sectional view of the foam gun taken along line 15—15 of FIG. 14 to show a locking mechanism of the gun;

FIG. 16 is a perspective view of the locking member and the trigger of the gun, shown in a locking position;

FIG. 17 is a perspective view similar to FIG. 16, but in an unlocked position;

FIG. 19 is a perspective view of a needle assembly of the foam gun;

FIG. 20 is an enlarged front perspective view of the front of an arm of the needle assembly;

FIG. 21 is a front perspective view of a cup of the foam gun; and

FIG. 22 is a rear perspective view, partially in cross-section, of a nozzle of the foam gun.

Corresponding reference numerals will be used throughout the several figures of the drawings.

DETAILED DESCRIPTION OF THE INVENTION

Figure 1:
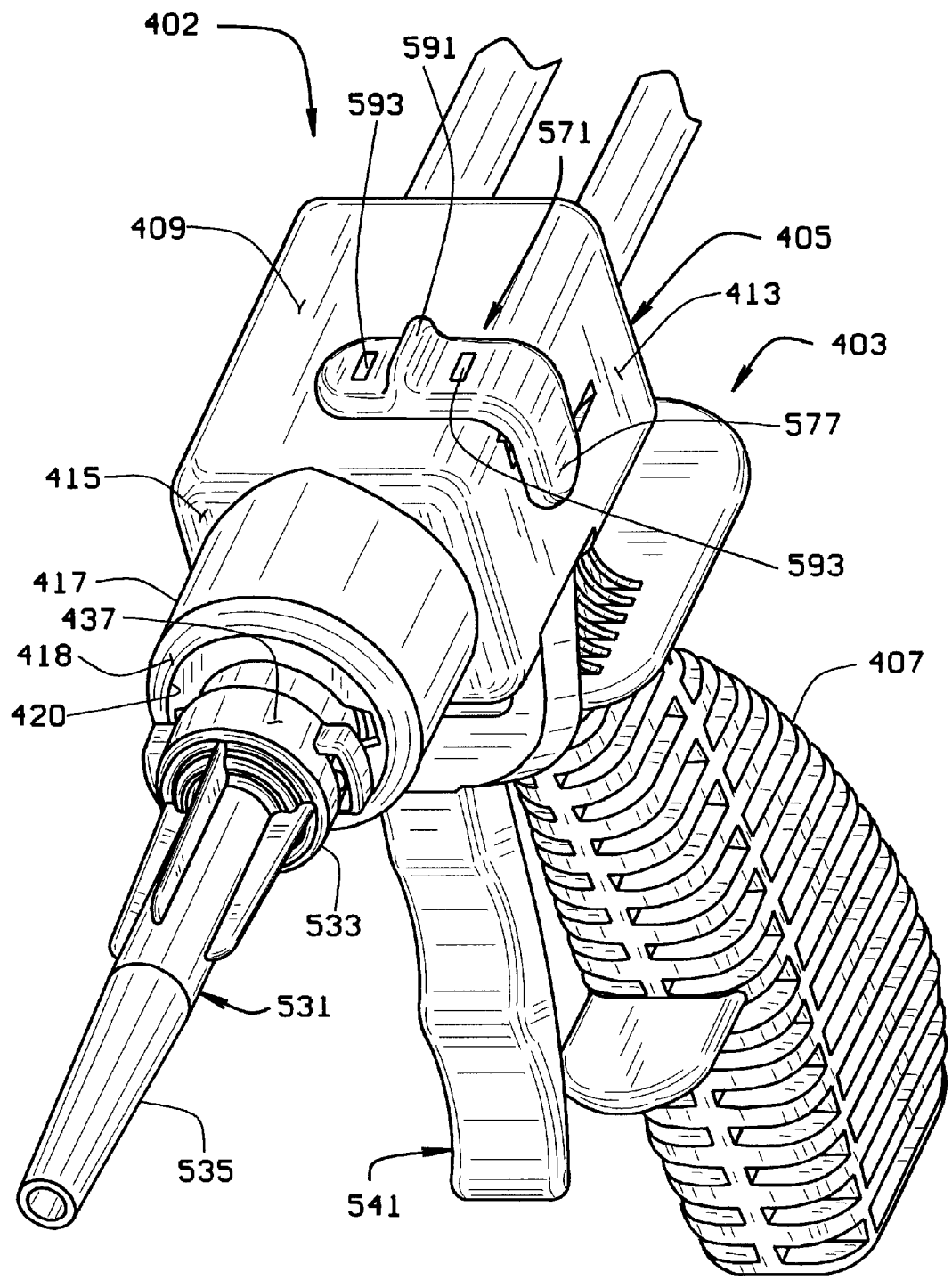
FIG. 1 is a perspective view of one illustrative embodiment of a foam gun of the present invention.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention.

An illustrative embodiment of a foam dispensing gun 1 of the present invention is shown generally in FIGS. 1A and 1B. The gun 1 includes a one-piece body 3 having a handle or grip 5 and a housing 7. The housing 7 is hollow, and as described below, a fluid flow path for each of an A resin component and a B resin component passes through the housing. As is common, the flow paths are connected to separate sources of an A resin and a B resin. As is known, the A resin may includes diisocyanates in a propellant and the B resin may include polyglycols, phosphates, dichlorofluoroethane, and chlorodifluoromethane. The flow paths are controlled so that the resins pass through the flow paths to a mixing chamber where the components are mixed together to form a urethane foam. The foam is then forced out a nozzle to be applied to a substrate where it will quickly set. When the A and B resins mix, they react to form a homogeneous urethane polymer foam which exits the gun in liquid form. The foam material expands about 30 times the volume of liquid after its being dispensed and dries into a rigid, closed cell polyurethane foam.

The housing 7 has a top surface 9, a bottom surface 11, side surfaces 13, and a front surface 15 defining a chamber 16. The front surface 15 has an opening 17. Internally, the front surface 15 and surfaces 9, 11, and 13 form a shoulder 19 (FIG. 5). The rear 21 of the housing is open. Axially aligned holes 23 are formed in the side walls 13 near the back 21 of the housing 7. Lastly, two rectangular openings 27 are formed in the bottom surface 11 slightly forward of the holes 23 and at the sides 13.

A cup 31 is slidably received in the housing chamber 16. The cup 31 includes a generally rectangular base 33 having a height slightly less than the height of the chamber 16, so that the base can be slidably received in the chamber 16. The cup base 33 has a width less than the width of the chamber 16. A pair of vertical flanges 35 extend from the sides of base 33 at the front thereof. The flanges 35 extend out from the body 33 a distance, such that the combined width of the two flanges and the body is slightly less than the width of the chamber 16. The body 33 and flanges 35 thus cooperate to position the cup 31 within the chamber 16. A cylindrical portion 37 extends forwardly of the body 33. The cylinder 37 has an outer diameter slightly less than the forward opening 17 of the housing 15. A cylindrical nose 39 having a diameter slightly less than the diameter of the cylindrical portion 37 extends forwardly of the cylindrical portion 37. The nose 39 includes an annular groove 41 which receives an O-ring (not shown), four spaced apart barbs 43, the tops of which are flattened or dulled, and a forward surface 45. The cup 31 is received in the chamber 16 such that the nose 39 extends out the opening 17, as seen in FIGS. 1A–2B.

Internally, the cup 31 has a rear chamber 49 which opens into two forwardly extending bores 51. The chamber 49 extends to approximately the flanges 35, and the bores 51 extend from the end of the chamber 49 to approximately the end of the cylindrical portion 37. Narrower bores 53 extend from the end of the bores 51 through the nose 39 to exit out or open up at the forward surface 45 of the nose 39. As can be seen in FIGS. 5 and 6, the bores 53 are on a diameter of the bores 51, but are radially off-set from the center of the bores 51.

A coiled spring 55 sized to fit over and around the cup cylindrical portion 37 is positioned between the inner shoulder 19 of the housing 7 and a forward surface of the cup flange 35. As can be appreciated, the spring 55 biases the cup rearwardly in the chamber 16.

A needle assembly 61 (shown in FIGS. 2A,B, 4, 5, and 7) is received in the chamber 16 behind the cup 31. The needle assembly 61 has a base 63 which is generally rectangular in rear elevation, and has dimensions slightly less than those of the chamber 16 so that the base 63 of the needle assembly 61 can be received in the chamber 16. The base 63 includes a pair of vertical, inwardly directed shoulders 65 at the forward corners of the base 63 which extend vertically the height of the base 63. A fulcrum 67 is formed at the base of the shoulder 65.

A cylindrical projection 69 having a front surface 71 extends from the front of the base 63. The cylindrical projection 69 is sized and shaped to be received telescopically in the rear chamber 49 of the cup 31. Two spaced apart cylindrical arms 73 extend forwardly from the front surface 71 of the cylindrical projection 69. The arms 73 lie on a horizontal diameter of the projection 69. A groove 75 is spaced slightly behind the front surface 77 of the arms 73 to receive an O-ring 79. The arms 73 are shaped and sized to be received in the bores 51 of the cup 31. When the needle assembly arms 73 are received in the cup bores 51, the O-rings 79 seal against the inner surface of the cup bores 51 to form a fluid tight seal. The seal prevents fluid, and in particular, the resins, from flowing rearwardly through the cup in to the cup chamber 49 where they would otherwise be able to mix together.

A solid needle 81 extends forwardly from the front surface 77 of each arm 73. As can be seen in FIGS. 5 and 7, the needles 81 are positioned on a horizontal diameter of the arms 73, but are radially off-set from the center of the arms 73 to be closer to the center of the cylindrical portion 69. A groove 83 is formed at the base of each needle to receive an O-ring 85. The needles 81 have a generally conical rear portion 87 and a generally cylindrical forward portion 89. The needles 81 are sized to be received in the passages 53 in the nose 39 of the cup 31. The cylindrical portion 81 of the needle has a diameter less than that of the cup bore 53, and the conical section has a diameter, at the back thereof, substantially equal to the diameter of the passage 53. As seen in FIG. 2A, when the needle 81 is fully received in the cup bore 53, the O-ring 85 seals against the forward surface of the cup bore 51, forming a fluid tight seal around the entrance into cup bore 53, to prevent fluid from entering cup bore 53.

The needle assembly 61 has two substantially identical passages 87 extending therethrough. The passages each include a base portion 89 extending forwardly from the rear of the needle assembly base 63, an intermediate portion 91 of smaller diameter than the base portion 89 and which extends to approximately the forward surface of the base 63, and a narrow passageway 93 which passes though the cylindrical projection 69 and arm 73. The passageway 93 opens at the front surface 77 of the arm 73 and is positioned so that it is not blocked by the needle 81 or the O-ring 85 at the base of the needle 81.

Connectors or fittings 95 are received in the rear portion 89 of the needle assembly passage 88. The fittings 95 each have a flexible hose 97 extending from the rear thereof. One of the hoses is connected to a source (i.e. a tank) of the A resin and the other is connected to a source (tank) of the B resin. As is known, the sources of A and B resin are pressurized. The fitting has a body 99 which receives the hose 97 and a nose 101 which is received in the rear portion 89 of the needle assembly passage 88. The fitting nose 101 has a convex annular groove 103 and a rectangular annular groove 105, the groove 105 being forward of the groove 103. An O-ring 104 is received in the groove 103 to form a fluid tight seal between the connector 95 and the needle assembly 61. A screen 107, an annular flat washer 109, a ball 111, and a ball spring 113 are positioned in front of the fitting 95 in the rear portion 89 of the passage 88. As can be appreciated, the washer 109, ball 111, and spring 113 define a ball valve which is opened by the pressure of the components passing through the fittings and into the passage 88. When there is no fluid pressure from the tanks, the balls 111 are urged against the washers 109 by the spring 103 to close the fittings 95.

The base 63 of the needle assembly 61 has two vertically spaced apart openings 115 which communicate with the rear portion 89 of the passage 88. The base 63 also has a bore 117 formed on either side of the base in front of the openings 115. The openings 115 and 117 form a triangular pattern, as can be seen in FIG. 4. The openings 115 of each side of the base 63 are axially aligned with each other. Pins 119 (FIGS. 2A and 2B) pass through the openings 115 to be received in the groove 103 of the fitting 95. The pins are sized such that the backs of the pins 119 do not extend beyond the sides of the base 63 so that they will not interfere with the insertion of the needle assembly 61 into the housing 7. Preferably, the openings 115 extend all the way through the base 63, such that the pins will extend through the base and will tangentially pass through the grooves 103 of the fittings 95. The use of the two pins 119, one passing through the top of the fitting groove 103 and one passing through the bottom of the fitting groove 103 securely holds the fitting 95 in the needle assembly chamber 89.

A retaining pin or set screw 121 passes through the opening 23 in the side of the gun housing 7 to be received in the bore 117 in the needle assembly base 63. The needle assembly 61 is thus positionally fixed relative to the housing, and does not move.

As can be appreciated, the cup 31 and needle assembly 61 define a needle valve assembly having two separate and distinct fluid flow paths therethrough, one for the A resin and one for the B resin. The fluid flow paths for the A and B resin are defined by the passages 87 through the needle assembly 61, the forward portion of the cup passages 51, and the cup nose passages 53. The seals formed by the O-rings 79 and 85, as noted above, create fluid tight seals between the cup 31 and the needle assembly 61, so that the A and B resins will not come into contact with each other until they exit the cup 31 through the cup nose 39 at the outlets of the cup bores 53. The needles 71 of the needle assembly 61 form or define the valve elements for the valve assembly and the forward surface of the cup bores 51 form valve seats. Unlike common needle valves, wherein the valve element moves relative to the seat, in the present invention, the seat (i.e. the forward surfaces of cup bores 51) moves relative to the valve element (i.e. the needles 81) to open and close the fluid paths. As can be appreciated, the spring 55 biases the valve assembly closed (as seen in FIG. 2A). By moving the cup 31 forward in the housing, the openings to the passages 53 will be moved forwardly of the rear of the needles 81, and the passage 53 will be open and in fluid communication with the tubes 93 extending through the needle assembly arms 73, and the valve assembly will be opened (as seen in FIG. 2B) to allow for the resins to pass through their respective flow paths.

As can be appreciated, movement of the cup toward and away from the needle 81 will open and close the two fluid paths substantially simultaneously. Further, the two fluid paths will be open to the same degree. Thus, as long as the supply tanks of the A and B resins are pressurized to an equal extent, the A and B resins will flow through the gun 1 at substantially the same velocity. The two resins will thus mix in a 1:1 ratios ±5%, the preferred mixing ratio for the resins. This ability to mix the fluids in substantially a 1:1 ratio will produce a better urethane foam which will not have unreacted components therein.

A disposable nozzle assembly 131 (FIGS. 4 and 5) is removably mounted to the nose 39 of the cup 31 on an outer side of the housing forward surface 15. The nozzle assembly 131 includes a hollow base section 133 defining a mixing chamber 135 and a hollow nozzle 137. The cup bores 53 open into the mixing chamber 135 where the A resin and B resin are mixed. The mixing chamber is designed to be self-mixing. Prior to this point, the A resin and B resin are kept separate, and, as noted above, the telescoping connection of the needle assembly 61 in the cup 31 with the two O-rings for each needle 81 keep the two flow paths completely separate, and the A and B resins cannot mix in the body housing 7. The two components contact each other for the first time in the nozzle assembly mixing chamber 135. The two resins, when mixed, react, as is known, to form a foam. This foam is ejected out the nozzle 137 against the substrate to which the foam is to be applied.

An operating lever 141 is provided which is in operative contact with the cup 31 to move the cup 31 forwardly relative to the needle assembly 61 to open the valve assembly to allow the A and B resins to pass through their respective flow paths, mix in the mixing chamber 135 and be ejected out the nozzle 137. The operating lever 141 has a yoke 143 and an operating arm 145 extending beneath the yoke. The operating lever 141 is positioned such that the operating arm 145 is forward of the grip 5, as seen in FIGS. 1A,B, such that it may be grasped by a user and pulled toward the grip to actuate the gun 1. The yoke 143 includes two generally parallel spaced apart arms 145 which are joined by a base 149. The operating arm 145 depends downwardly from the middle of the yoke base 149. The yoke arms are spaced apart a distance, and sized, to pass through the openings 27 in the bottom 11 of the housing 3. The yoke arms 147 each have a head 151 having a forward surface 153 and a rear surface 155. The yoke head 151 is positioned in the housing chamber 16 such that the forward surface 153 of the yoke head is in contact with the rear surface of the cup flange 35. The rear surface 155 of the yoke head 151 is in contact with the fulcrum 67 of the needle assembly 61. The rear surface 155 of the yoke head 151 has a concave groove 157 at the base of the head and which is shaped complimentary to, and engages, the needle assembly fulcrum 67. The groove 157 and fulcrum 67 thus define a pivot point for the operating lever 141, which is positioned at the base of the yoke arms' heads 151. When the operating arm 145 is pulled rearwardly toward the grip 5, the yoke head 151 will pivot forwardly to push the cup 31 forwardly. As described above, the forward movement of the cup will open the fluid flow passages to allow for the resins to pass through the gun and into the mixing chamber 135. When the operating arm 145 is released, the spring 55 will force the cup 31 rearwardly to close the passages against flow of the resins therethrough, and will cause the operating lever 141 to pivot about the needle assembly fulcrum 67.

The foam gun 1 is provided with a stop mechanism 171 on the rear side of the grip 5 which is normally biased into operative contact with the operating arm 145 of the lever 141 when the lever is in its first or closed position (as seen in FIG. 1) to prevent accidental actuation of the gun. The stop mechanism 171 includes a stop member 173 pivotally mounted in a chamber 175 in the grip 5. As can be seen, the grip chamber 175 has a top portion 175A which extends from the rear to the front of the grip at the top of the chamber, and a bottom portion 175B which extends longitudinally along the back of the grip. The stop member 173 includes an arm 177 and a finger 179 extending forwardly from the top of the arm 177. The finger 179 preferably does not form a right angle with the arm 177. Rather, the finger and arm join at an oblique angle of about 110° to about 115°.

A pin hole 181 is formed in the arm 177 beneath the finger 179. A corresponding hole 183 (FIG. 4) is formed in the grip 5, and a pin (not shown) extends through the grip and arm 177 to define a pivot point for the member 171. As can be seen in FIGS. 1A and 1B, the stop member 171 is received in grip chamber 175 such that the finger 179 extends through the grip chamber portion 175A to protrude out the front of the grip. The arm 177 is sized such that it may fit in the grip chamber portion 175B.

A bore 187 is formed in the grip 5 and extends generally forwardly from a forward surface of the grip chamber portion 175B. The bore 187 receives a spring 187 and a pin 189. The spring 187 biases the pin outwardly into contact with the forward surface of the stop member arm 177.

The operating lever 141 includes a projection 191 in the center of the base 149 of the yoke 143. The projection 191 has a back surface 193 and a sloped surface 195 extending upwardly and forwardly from the back surface 193. The stop member finger 179 is sized and positioned to contact the back surface 193 of the projection 191, as seen in FIG. 1A when the gun is not activated. In this first position, the operating lever 141 cannot be moved towards the grip to activate the gun 1. Thus, the gun 1 cannot be inadvertently activated. To activate the gun 1, the stop member 171 must be squeezed against the grip 5, as shown in FIG. 1B. This will cause the finger 179 to move up out of the way of the projection 191, and the operating lever 141 can be moved towards the grip 5 to activate the gun 1, as described above. When the lever 141 is released, to deactivate the gun 1, the spring 55 will cause the lever 141 to pivot forwardly, as described above. At the same time, the spring 187 will push against the pin 189, and hence against the stop member arm 177. This will cause the stop member 171 to pivot about its pivot point, and the finger 179 will be brought into contact with the back surface 193 of the projection 191. The sloped surface 195 of the projection 191 facilitates the movement of the stop member 173 from the position shown in FIG. 1B to the position shown in FIG. 1A. With the stop member in its locking position (FIG. 1A), the trigger arm cannot be pulled against the grip, and the gun cannot be accidentally activated.

A prior art type of disposable foam gun 201, of the applicants, is shown in FIGS. 9–13. The gun 201 includes a plastic one-piece body 203 having a housing 205 and a grip 207. The gun housing 205 has a top 209, sides 211, and a back 213, and is opened at its bottom and front. The housing top 209 is dividable into a forward portion 209A and a rear portion 209B. The forward portion 209A is raised relative to the rear portion 209B, and a step 214 is formed between the two. The grip 207 which depends from the housing 205 has a back 215 and sides 217, but is open at its front and bottom. A plate 219 is fixed in the grip 207 at the front thereof to partially close the grip 207 along its front. The plate 219 has a pair of spaced apart fingers 221 along each vertical edge of the plate. The fingers 221 are snappingly received in holes 223 in the grip 207 to secure the plate 219 in the gun body 203.

A connector assembly 231 is mounted in the body 203 at the base of the grip 207, and closes the bottom of the grip 207. The connector assembly 231 includes a mounting plate 233 and a pair of hollow connectors 235 which pass through the mounting plate 233. The mounting plate 233 has an ear 237 on its sides which are snappingly received in openings 239. The ear 237 preferably has a top surface which is has a portion 241 which is generally parallel to the side of the mounting plate 233 and a sloped surface 243 which slopes from the surface 241 to the side of the mounting plate 233. The connectors 235 each have a bottom portion 245 which is externally threaded and an upper portion 247. The lower portions 245 are removably connectable to hoses (not shown) which in turn are connected to sources (i.e., pressurized tanks) of the A resin and B resin. A plastic or rubber tube 249 is connected to and extends from the top portions 247 of each connector 235. The connectors 235 are brass connectors and the mounting plate 233 is made of plastic. The brass connector may be a two piece connector which is mounted to the mounting plate. Alternatively, the mounting plate 233 can be molded about the connectors 235. The mounting plate 233 and connectors 235 could, alternatively, be molded as a single plastic piece, provided the plastic used will not react with the resins. This last alternative would reduce manufacturing cost by eliminating the need for a brass part and by eliminating a step of securing the brass fitting to the connector of inserting the brass fitting in the mold.

A nozzle mounting assembly 251 is mounted at the front of the housing 209 and closes the front of the housing 205 and a forward portion of the bottom of the housing. The mounting assembly 251 includes a base 253 sized to close the front of the housing and has a top and side surfaces which are generally flush with the top 209A and side 211 of the housing 205. (FIG. 9) A peripheral step 255 is formed around the top and sides of the base 253 and is of a depth equal to the width of the surfaces of the housing 205. An ear 257 is extends rearwardly from the step 255. A bottom plate 259 extends rearwardly from the base 253 near the base thereof. The plate 259 has an ear 261 at its back end. The ears 257 and 261 of the mounting assembly are snappingly received in openings 263 and 265, respectively, on the housing, to mount the assembly 251 in the housing 203.

A pair of hollow bosses 267 extend rearwardly from the back surface of the base 253. The bosses 267 each receive a hollow bushing, which in turn, receives a forward end of the tubes 249. A cylindrical nose 269 extends forwardly from the outer surface of the base 253. The nose 269 has two bores 271 each of which communicates with one of the bosses 267 so that the bores 271 are in fluid communication with the tubes 249, and hence the sources of the A resin and the B resin. A circumferential groove is formed in the nose, near the front thereof, to receive an O-ring 273.

Lastly, the nozzle mounting assembly 251 has an upper and lower bracket 275, each of which has an arm 277 extending from the base 253 and a finger 279 extending from the arm 277 towards the nose 269.

A disposable nozzle assembly 281 is removably mounted to the nozzle mounting assembly 251. The nozzle 281 includes a base 283 and a hollow tapering nozzle 285. The nozzle assembly base 281 has a width less than the width between the tips of the bracket fingers 279 and a height slightly less than the distance between the bracket arms 277. The nozzle 281 is sized, at the base, to fit over the nose 269. The nozzle assembly 281 is applied to the nozzle mounting assembly by placing the nozzle assembly over the mounting assembly nose 269 and then rotating the nozzle assembly 281 about the nose so that the base 283 will be received in the brackets 275 to secure the nozzle assembly 281 to the mounting assembly 251.

The fluid flow paths of the resins are defined by the tubes 249 which extend from the connectors 235, the mounting assembly nose 269, and the nozzle 281. As can be seen, the tubes 249 travel up the grip 207 of the gun 201, and through the housing 205. The tubes 249 follow the inner surfaces of portions 209B and 209A. Thus, there is a slight step in the flow path at the step 214 in the housing top 209.

A trigger 291 extends upwardly through the bottom of the housing 205 in front the grip 207 to be pivotally mounted in the housing. The trigger 291 has a trigger head 293 which is received in the housing 205 and a trigger arm 295 which extends down from the head 293 forwardly of the gun grip 207. The trigger head 293 has a transverse hole extending through its top which receives a pin 297. The pin 297 extends through pin holes 299 in the sides 211 of the housing to pivotally mount the trigger 291 in the housing. The trigger 291 is mounted in the housing 205 just forward of the shoulder 214, as can be seen in FIGS. 12 and 13. The tubes 249 extend over the trigger head 293 to be positioned between the head 293 and the step 214.

A spring 301 is provided to bias the trigger to a first position (FIG. 12) wherein the resins are prevented from flowing through the tubes. The spring 301 is preferably a torsion spring having a center coil 303 and two arms 305 extending away from the coil 303 in generally opposite directions. The trigger head 301 has an opening 307 therethrough sized to receive the spring coil 303. The pin 297 then passes through the coil 307. One of the spring arms 305 bears against the rear surface of the trigger arm 293, and the other of the spring arms 305 bears against the inner surface of portion 209B of the top surface 209. The spring 301 thus biases the trigger 291 forwardly, as seen in FIG. 12. When the trigger is in this forward position, the trigger head 293 squeezes the tubes 249 against the inner surface of the step 214, to close the tubes 249 to prevent the resins from flowing through the tubes. When the trigger 291 is squeezed, as shown in FIG. 13, the trigger head 303 is pulled away from the tubes 249, and the fluid can then flow through the tubes 249.

The trigger arm 295 includes a plurality of grooves or channels 311 extending across its front surface. A locking bracket 313 is provided which can be used to hold the trigger at a desired position. The locking bracket 313 has a pair of side arms 315 having fingers 317 at their ends which are received in holes in the sides 217 of the grip 207. A front member 319 extends between the arms 315, and a handle 317 extends from the member 319. The bracket 313 is pivotal with respect to the grip 207, and the front member 319 is sized to be received in the trigger arm grooves 311. By placing the member 319 in a desired one of the grooves 311, the tubes will be set opened a desired amount. Thus, the flow of fluid through the gun will be consistent.

A preferred embodiment of the foam gun is shown in FIGS. 1 and 14–22. The foam gun 401 is substantially similar in operation to the gun 1 of FIG. 1A. The foam gun 401 includes a one-piece body 403 having a handle or a grip 405 and a housing 407. The housing receives a cup 431 and a needle assembly 461. As with the foam gun 1 of FIG. 1A, the needle assembly 461 is fixed relative to the housing 407 and the cup 431 is movable in the body to open and close the fluid flow paths through the gun 431.

The housing 407 has a top surface 409, a bottom surface 411, side surfaces 413, and a front surface 415 which, in combination, define a chamber 416. A hollow cylinder 417 extends from the front surface 415. The cylinder 417 has a front surface 418 and an opening 420 through which the cup assemby 431 extends, as will be described below. The chamber 416 extends through the cylinder 417, such that the chamber opens through the opening 420 at the front of the cylinder 417. The rear 421 of the housing is open. Axially aligned slots or holes 423 are formed in the side walls 413 near the back 421 of the housing 407. Lastly, two rectangular openings 427 are formed in the bottom surface 411 and at the sides 413 of the housing 407.

Figure 18:
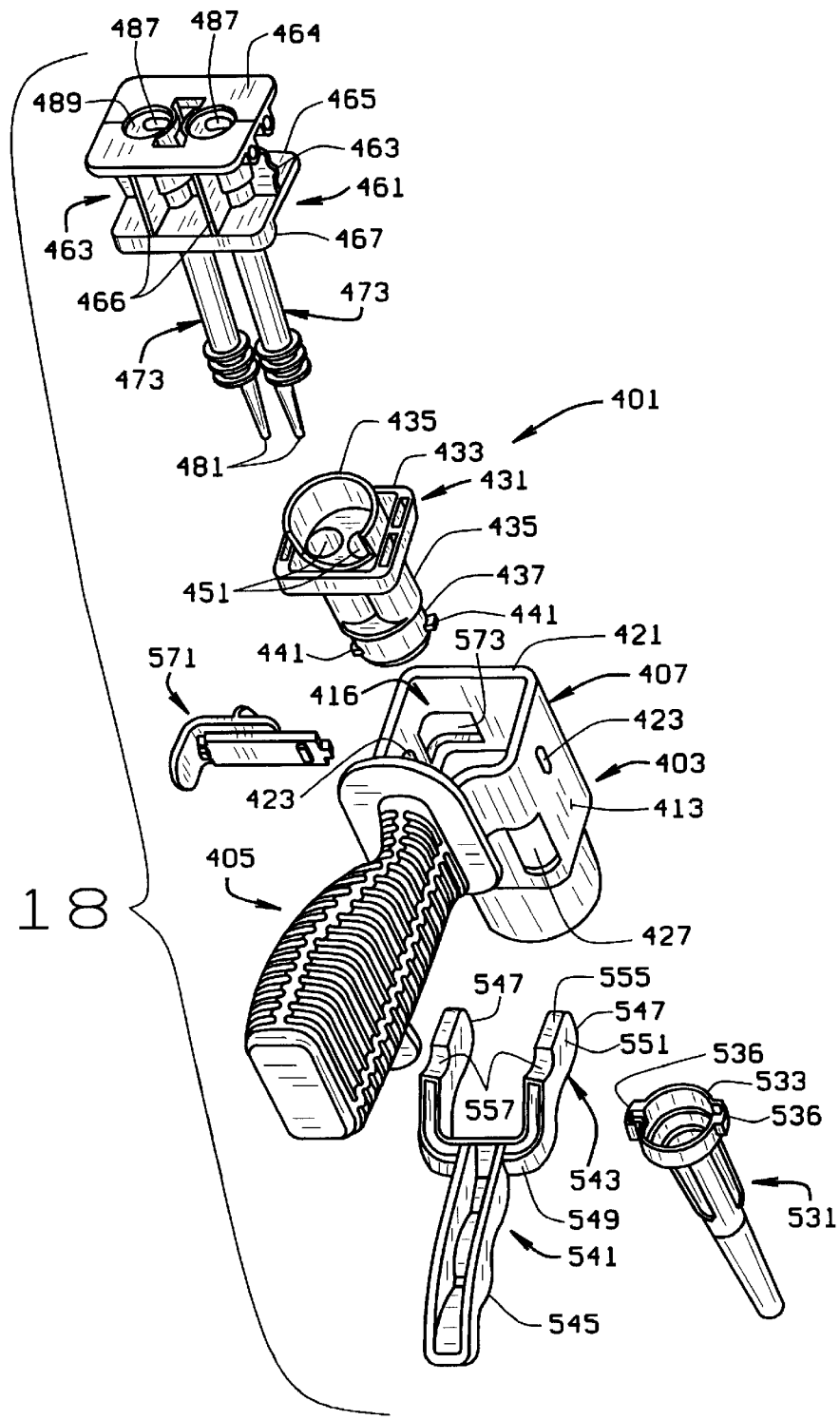
FIG. 18 is an exploded perspective view of the foam gun.

A cup 431 is slidably received in the housing chamber 416. The cup 431 includes a generally rectangular base 433 having a height slightly less than the height of the chamber 416, so that the base can be slidably received in the chamber 416. The cup base 433 has a width less than the width of the chamber 416. An open cylinder 435 extends from the back of the base 433. The cylinder 435 is not a complete cylinder. Rather, it completes about 270° of arc, and is open at the bottom, as can be seen in FIG. 18. A pair of connected cylindrical tubes 436 extend forwardly of the body 433, and a cylindrical nose 437 extends forwardly from the tubes 436. The nose 437 has an outer diameter slightly less than the forward opening 420 of the housing cylinder 417 and less then the circumference of the tubes 436. The nose thus forms a shoulder 438 with the front of the tubes 436. The nose 437 has a pair of fingers or keys 441 spaced slightly rearwardly of the front of the nose. The cup 431 is received in the chamber 416 such that the nose 437 extends out the opening 420, as seen in FIGS. 14 and 18.

Internally, the cup 31 has two forwardly extending bores 451 which have an entrance in the base 433 of the cup assembly. The bores 451 have a generally constant diameter through the tubes 436 of the cup assembly. The tubes 436 open into a second pair of tubes 452 which have a decreasing diameter. The bores 451 extend through the tubes 451 and 452 and have exits 453 at the front of the nose 437. (FIG. 21). The bores exits 453 and the tubes 452 lie on a diameter of the nose 437, but are radially off-set from the center of the nose 437.

Although not shown in the drawings, a coiled spring, similar to the spring 55 of FIG. 5, is provided to fit over and around the cup nose 437 and is positioned between the inner surface of the housing cylinder front surface 418 and the shoulder 438 at the forward surface of the tubes 436 to bias the cup rearwardly in the chamber 16.

A needle assembly 461 (shown in FIGS. 18–20) is received in the chamber 416 behind the cup 431. The needle assembly 461 has a base section 463 which is generally rectangular in rear elevation, and has dimensions slightly less than those of the chamber 416 so that the base 463 of the needle assembly 461 can be received in the chamber 416. The base 463 includes a back wall 464 and a front wall 465. The back and front walls 464 and 465 are spaced apart from each other and a pair of vertical ribs 466 and a vertical rib 468 are extend between the front 465 and back 464 walls. A fulcrum 467 is formed at the base or bottom of the front wall 465 on the front surface of the front wall. When the foam gun 401 is assembled, the needle assembly back wall 464 closes the back 421 of the housing 407.

Two spaced apart cylindrical arms 473 extend forwardly from the front surface of the base front wall 465. The arms 473 are generally vertically centered on the front wall 465. A plurality of circular flanges 475 extend radially from the arms 473 at the front thereof. The forward most flange 475 defines a forward surface 477 of the arms 473. The arms 473 are received in the cup bores 451, and the flanges 475 are sized to have a diameter slightly less than the inner diameter of the tubes 435 (the constant diameter portion of bores 451). When the needle assembly arms 473 are received in the cup bores 451, the flanges 475 seal against the inner surface of the cup bores 451 to form a fluid tight seal. The seal prevents fluid, and in particular, the resins, from flowing rearwardly through the cup where they would otherwise be able to mix together.

A solid needle 481 extends forwardly from the front surface 477 of each arm 473. As can be seen in FIGS. 19 and 20, the needles 481 are positioned on a horizontal diameter of the arms 473, but are radially off-set from the center of the arms 473 to be closer to the horizontal center of the needle assembly 461. A groove 483 is formed at the base of each needle to receive an O-ring. The needles 481 have a generally conical in shape and are sized to be received in the portion of the cup bores 451 which extend through the tubes 452. As can be appreciated, when the needle 481 is fully received in the cup tube 452, the O-ring on the needles 481 will seal against an inner forward surface of the cup tube 435 to form a fluid tight seal around the entrance into cup tube 452 to prevent fluid from entering cup tube 452.

The needle assembly 461 has two substantially identical passages 487 extending therethrough. The passages 487 each include a base portion 489 extending forwardly from the back wall 464 of the needle assembly base 463 to an exit 491 in the front surface 477 of the arms 473. At the back wall 464 of the needle assembly, the passages 487 each have a connecting mechanism for connecting hoses to the foam gun 401 to connect the foam gun to sources of the A resin and B resin. The exits 491 to passages 487 are positioned on the front surface 477 of the arm 473 so as not to be blocked by the needle 481 or the O-ring at the base of the needle 481. As seen in FIG. 20, the exit 491 is preferably generally crescent shaped.

A disposable nozzle assembly 531 (FIGS. 18 and 22) is removably mounted to the cup nose 437. The nozzle assembly 531 includes a hollow base section 533 which fits over the nose 437 of the cup 431 and a hollow nozzle 535. A pair of oppositely positioned ears 536 are formed at the rear of the nozzle assembly base 533. The ears 536 each have a generally L-shaped channel 538 (FIG. 22) which forms a key-way. The key-way 538 and the fingers or keys 441 on the cup nose 437 are complimentary sized and shaped so that the key-way 538 can be applied over the keys 441. Thus, to mount the nozzle assembly 531 to the cup 431, the nozzle assembly 531 is applied to the cup nose 437 so that the keys 441 will enter into the key way 536. The nozzle assembly 531 is then rotated so that the key enters the circumferential part of the key-way 536 to secure the nozzle assembly 531 to the cup 431.

The cup bores 451 open into the nozzle 535 where the A resin and B resin are mixed together. The nozzle 535 thus defines a mixing chamber for the foam gun 401. The mixing chamber is designed to be self-mixing. Prior to this point, the A resin and B resin are kept separate, and, as noted above, the telescoping connection of the needle assembly 461 in the cup 431 and the seals between the cup 431 and needle assembly 461 for each needle 481 keep the two flow paths completely separate, and the A and B resins cannot mix in the body housing 407. The two components contact each other for the first time in the nozzle 535. The two resins, when mixed, react, as is known, to form a foam. This foam is ejected out the nozzle 535 against the substrate to which the foam is to be applied.

An operating lever 541 is provided which is in operative contact with the cup 431 to move the cup 431 forwardly relative to the needle assembly 461 to open the valve assembly to allow the A and B resins to pass through their respective flow paths, mix in the nozzle 535 and be ejected out the nozzle. The operating lever 541 has a yoke 543 and an operating arm 545 extending beneath the yoke. The operating lever 541 is positioned such that the operating arm 545 is forward of the grip 405, as seen in FIG. 1, such that it may be grasped by a user and pulled toward the grip to actuate the gun 401. The yoke 543 includes two generally parallel spaced apart arms 145 which are joined by a base 549. The operating arm 545 depends downwardly from the middle of the yoke base 549. The yoke arms 545 are spaced apart a distance, and sized, to pass through the openings 427 in the bottom 411 of the housing 403. The yoke arms 547 each have a head 551 having a forward surface 553 (FIGS. 16–17) and a rear surface 555 (FIG. 18). The top of the head 551 has a flat 554 and a rear shoulder 556. The yoke head 551 is positioned in the housing chamber 416 such that the forward surface 553 of the yoke head 551 is in contact with the rear surface of the cup base 433. The rear surface 555 of the yoke head 451 is in contact with the fulcrum 467 of the needle assembly 461. The rear surface 555 of the yoke head 551 has a concave groove 557 at the base of the head 551 and which is shaped complimentary to, and engages, the needle assembly fulcrum 467. The groove 557 and fulcrum 467 thus define a pivot point for the operating lever 541. When the operating arm 545 is pulled rearwardly toward the grip 405, the yoke head 551 will pivot forwardly to push the cup 431 forwardly. As described above, the forward movement of the cup will open the fluid flow passages to allow for the resins to pass through the gun and into the nozzle 535 to be mixed in the nozzle 535. When the operating arm 545 is released, the spring around the nose 437 of the cup 431 will force the cup 431 rearwardly to close the passages against flow of the resins therethrough, and will cause the operating lever 541 to pivot about the needle assembly fulcrum 467.

A lock 571 is provided to prevent the operating lever 545 to be inadvertently pulled to the grip. The lock 571 is received in the housing 401 and extends through an opening 573 in the side 413 and top 409 of the housing. The lock 571 includes an external part 575 having a top portion 577 and a side portion 579. The external part 575 is generally L shaped, as seen in FIGS. 15–17 and is sized to close the opening 573. An internal part 581 extends perpendicularly from the inner surface of the side portion 579 and is spaced from the inner surface of the top portion 577 by a rib 583. The top portion 577 of the external part 575 extends beyond the rib 583. The internal part 581 of the lock 571 has a length substantially equal to the width of the housing 405 and an opening 585 is formed in the side 413 of the housing opposite the opening 573 through which the internal part 581 can extend. As the internal part 581 extends beyond the rib 583, the internal part 581 and the external part 575 define a channel 587 sized to receive the top 409 of the housing 405. The internal part 581 also includes a pair of blocks 589 which depend from the bottom of the internal part 581 and are spaced apart a distance equal to the distance between the arms 547 of the operating lever yoke 543. The blocks 589 are sized and shaped to be slidable over the flat 554 in the top of the arm head 551. As can be appreciated, when the lock 571 is pushed across the housing, the blocks 581 will be lodged in front of the shoulders 556 on the yoke arms 547. In this position, the operating lever 541 will not be able to be pivoted forwardly. When the lock 571 is pulled in the opposite direction, the blocks 589 are pulled out of the path of movement of the arms 547, and the operating lever will be able to be pivoted. The exterior portion 575 of the lock 571 is preferable provided with a thumb tab 591 to facilitate movement of the lock 571. Markings 593 are preferably provided on either side of the thumb tab 591 to indicate which way to push or pull the lock 571 to enable or disable the foam gun 401. With reference to FIGS. 1 and 14–17, when the lock 571 is pushed to the left, the foam gun will be disabled, and when the lock 571 is pulled to the right, the foam gun will be enabled.

As can be appreciated, the foam guns 1 and 201 both provide guns wherein the resins mix in a mixing chamber which is part of the nozzle assembly. The resins thus do not mix inside the gun itself, but in the disposable nozzles. The foam gun 1 has a substantially straight flow passage which is unrestricted by presence of moving internal parts is provided inside the housing from the input port to the discharge point at the end of the opening of the dispensing pins. Although the gun 201 has a turn in the fluid flow path due to the tubes 249 extending up the grip, the turn is gradual, it is not a sharp turn. However, the connectors 237 could be mounted at the back of the housing, and the fluid flow lines would then be substantially straight. In both foam guns, there are a minimum of moving parts and seals. In the foam gun 1, only the cup 31 moves, by movement of the operating arm 141. The gun 1 has only two O-rings, O-rings 79 and 85, for each flow path to create the fluid tight seal to prevent the resins from entering the housing 7 through the valve assembly. This minimal amount of O-rings reduces the chances of O-ring failure. There are numerous known designs of foam dispensing devices having needle-valve assemblies and multiple moving needles with several seals at each end of the needle to seal the inner and outer portions of the moving needle. Unlike previously disclosed devices the foam gun 1 a pair of stationary needles or dispensing pins 81 which are a part of the material containing housing. Because the pins are not separated from the housing they do needle assembly 61. It is well known by practitioners of the art that probability of failure for identical events is directly proportional to a number of the identical objects. For example probability of failure of two identical O-rings is twice as high than probability of failure of a single O-ring of same kind, operating under the same conditions. Thus reducing the number of O-ring to a minimum possible will reduce probability of failure. The proposed design uses only four O-rings compared to some other designs, such as the design described by Finn, which uses eight O-rings for the same operation.

The disposable gun 201, on the other hand, uses no O-rings and its only moving part is the trigger arm 291 which acts as a valve by squeezing the tubes 249 closed.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense.

We claim:

1. A foam dispensing gun which dispenses a urethane foam produced by the reaction of an A component and a B component, the foam gun comprising:

a gun body including a housing and a grip depending from the housing, the grip being sized to be gripped by a user;

a dual valve assembly including a needle assembly and a cup assembly;

said needle assembly having a body, two fingers extending from said needle assembly body, an A fluid flow path having an entrance and an exit and which extends through one of said two fingers, a B fluid flow path having an entrance and an exit and which extends through a second of said two fingers, and a needle at the end of each finger; said needles being offset from the exits of said needle assembly flow paths; said A and B flow paths being separate from each other such that the A component and the B component do not mix in said needle assembly;

said cup assembly being slidably received in said gun body housing, said cup assembly having two separate passages therein extending through said cup assembly, said passages each having a first portion which slidably receives said fingers of said needle assembly and a second portion which slidably receives said needles of said needle assembly; and a nozzle assembly removably mountable to a front said cup assembly, such that said flow paths empty into said nozzle, said nozzle assembly including a nozzle in which said A and B components mix and through which the mixed components are ejected from said gun; and a trigger assembly having an operating arm, said trigger assembly being pivotally mounted to said body forwardly of said grip to be pulled toward said grip; said trigger assembly engaging said cup so that said cup can be selectively moved relative to said needle assembly between a first position in which said needles engage an opening to said passage second portions such that said valve assembly is closed to prevent flow of said components through said fluid paths and a second position in which said openings to said passage second portions are off-set from said needles such that said valve assembly is opened to permit the passage of said compounds though said foam gun; said trigger moving said cup such that said A and B fluid paths are opened and closed substantially simultaneously and are opened to the same degree.

2. The foam gun of claim 1 wherein said cup is biased to said first, closed, position.

3. The foam gun of claim 2 wherein said gun body housing has an opening at the front thereof through which said front of said cup assembly extends and wherein said cup includes a forwardly facing surface positioned rearwardly of the front surface of said cup assembly to be within said housing; said gun including a spring, said spring including a first end adjacent said cup forwardly facing surface and a second end adjacent a front of said housing, said spring biasing said cup to said closed position.

4. The foam gun of claim 3 wherein said trigger engages a rearwardly facing surface of cup flanges to move said cup between said first and second positions.

5. The foam gun of claim 4 wherein said needle assembly body has a fulcrum about which said trigger pivots to define a pivot point for said trigger.

6. The foam gun of claim 5 wherein said trigger includes a yoke portion and an operating arm portion depending from said yoke portion, said yoke portion including a base and spaced apart yoke arms extending up from said base, said yoke arms surrounding said cup and having a forward surface which engages said cup rearwardly facing surface and a rear surface which engages said needle assembly fulcrum.

7. The foam gun of claim 6 wherein said trigger yoke arms have concave indentations correspondingly shaped to said needle assembly fulcrums, said indentations of said yoke arm engaging said needle assembly body shoulders to pivot about said needle assembly body shoulders.

8. The foam gun of claim 1 including a lock for maintaining said foam gun cup in said first closed position.

9. The foam gun of claim 8 wherein said lock is located on said grip, said lock including a generally L-shaped lock member which is pivotally mounted to said grip oppositely of said trigger assembly, said lock member including an operating arm extending along a portion of said grip and a finger extending forwardly of said lock member operating arm, said lock member finger extending through said grip; said lock member being selectively pivoted between a first position in which lock member finger engages said trigger so that said trigger cannot be closed and a second position in which lock member finger does not prevent said trigger from being closed.

10. The foam gun of claim 9 wherein said lock member is biased to said first locking position.

11. The foam gun of claim 10 wherein said foam gun includes a bore in said grip extending forwardly from a rear edge of said grip, a spring received in said bore and a pin received in said bore, said pin being positioned between said spring and said operating arm of said locking member.

12. The foam gun of claim 9 wherein said foam gun includes a post extending rearwardly of said trigger assembly, said lock member finger engaging said trigger post when said lock member is in said first locking position.

13. The foam gun of claim 8 wherein said lock is on said housing;
said trigger including a yoke portion and an operating arm portion, said yoke portion including a yoke base and a pair of spaced apart yoke arms extending upwardly from said yoke base, said yoke arms extending upwardly through said housing on opposite sides of said cup and having a shoulder formed in the tops thereof;
said lock including a locking element having a pair of blocks depending from a lower surface of said locking element; said locking element being movably mounted in said housing between a first position in which said blocks engage said yoke arm shoulder to prevent pivotal motion of said trigger and a second position in which said blocks are out of engagement with said yoke arm shoulders to allow pivotal motion of said trigger.

14. The foam gun of claim 13 wherein said locking element is mounted in said housing to be slidable transversely relative to said housing.

15. The foam gun of claim 14 including a thumb tab on an exterior surface of said locking element to facilitate movement of said locking element between said first and second positions.

16. A foam dispensing gun which dispenses urethane foam produced by the reaction of an A component and a B component; the foam gun comprising:

a gun body including a housing and a grip depending from the housing, the grip being sized to be gripped by a user;

a dual valve assembly including a valve means and a cup assembly;

the valve means having a body, two valves extending from said valve means, an A fluid flow path having an entrance and an exit and which extends through said valve assembly and one of said valves; a B fluid flow path having an entrance and an exit and which extends through the valve assembly and a second of said two valves, said valves being offset from the exits of said valve assembly flow paths, said A and B flow paths being separate from each other such that the A component and the B component do not mix in said valve assembly;

the cup assembly being slidably received in said gun body housing, said cup assembly having two separate passages therein extending through the cup assembly, said passages each having a first portion which slidably receives said valves of said valve assembly; and a trigger assembly, operatively associated with said grip such that when said trigger assembly is actuated, said cup can be selectively moved relative to the valve between a first position in which said valve assembly is closed to prevent the flow of said components therethrough, and a second position in which said valves are opened, such that the valve assembly is opened to permit the passage of said components through said foam gun, said trigger assembly moving said cup such that said A and B fluid paths are opened and closed substantially simultaneously and are opened to substantially the same degree.

17. The foam dispensing gun of claim 16 further including a nozzle assembly removably mountable to a front of said housing and which receives a front of said cup assembly, said flow paths emptying into said nozzle, said nozzle including a mixing chamber in which the A and B components mix and a nozzle through which the mixed components are ejected from said gun.

* * * * *